United States Patent [19]

Blaha

[11] 4,012,678
[45] Mar. 15, 1977

[54] STARTING CIRCUIT FOR SINGLE PHASE MOTOR

[75] Inventor: Robert F. Blaha, Dedham, Mass.

[73] Assignee: Texas Instruments Incorporated, Dallas, Tex.

[22] Filed: Apr. 4, 1975

[21] Appl. No.: 565,031

[52] U.S. Cl. .................. 318/221 D; 318/221 E; 318/221 G

[51] Int. Cl.² .................................... H02P 1/44

[58] Field of Search ........ 318/220 R, 221 R, 221 C, 318/221 D, 221 E, 221 F, 221 G, 228, 229

[56] References Cited

UNITED STATES PATENTS

| 1,707,424 | 4/1929 | Bailey | 318/221 D |
| 3,725,757 | 4/1973 | Ehrens et al. | 318/221 D |

FOREIGN PATENTS OR APPLICATIONS

| 965,871 | 4/1948 | France | 318/221 D |
| 469,347 | 4/1937 | United Kingdom | 318/221 D |

Primary Examiner—Gene Z. Rubinson
Attorney, Agent, or Firm—John A. Haug; James P. McAndrews; Harold Levine

[57] ABSTRACT

A starting and running circuit for a single phase motor having a main field winding and a start field winding employing a single pole double throw switch in series with the start field winding to switch from a desired high torque starting mode to a high-efficiency running mode while overcoming the possibility of contact welding and failure of the switch upon stalling of the motor or momentary interruption in the line voltage during or immediately following starting. The single pole double throw switch is controlled by an actuation means which senses motor speed or another desired characteristic and in response to it causes the switching at the desired point.

1 Claim, 4 Drawing Figures

STARTING CIRCUIT FOR SINGLE PHASE MOTOR

BACKGROUND AND SUMMARY OF INVENTION

This invention relates to single phase, alternating current induction motors and more particularly to single phase fractional horsepower motors which switch from a high torque starting mode to a high efficiency running mode.

Single phase, alternating current induction motors conventionally have a main field winding and a start field winding, the windings being angularly displaced on a stator core and being energized by phase displaced currents to provide the starting torque for the motor. This phase-displacement current requirement can be provided, for example, by connecting a resistor or a capacitor in series with the start field winding which is de-energized along with the start winding when the motor approaches operational speed.

In certain applications, however, such as in hermetically sealed compressor motors as can be used in refrigerators, a capacitor is put in series with the start field winding and both remain energized during the operation of the motor to provide high efficiency of operation. With this circuit configuration often the starting torque is insufficient so an impedance element such as a resistor or a capacitor with a switch is put in parallel with the earlier mentioned run capacitor with actuating means such as a potential relay to disconnect the impedance element after starting. It is to be understood that a current relay or even a centrifugal switch could be used as actuating means. The addition of the impedance element provides a starting and running circuit with a high torque starting mode which is de-energized when the motor reaches a predetermined condition. This circuit has a major drawback especially when the impedance element is a capacitor in that stalling of the motor or a momentary interruption in the line voltage occurring during or immediately following starting will cause the actuating means to momentarily close and open the switch contacts thereby applying a current surge from the capacitors through the switch contacts which may cause welding and switch failure.

A recent attempt to overcome this contact welding problem involves the use of a thermal relay as described in U.S. Pat. No. 3,725,757. This approach, however, has the disadvantage of providing a delay before restarting as well as being complex and costly.

It is an object of this invention to provide an improved starting and running circuit for a single phase motor. It is another object of this invention to provide a starting and running circuit for a single phase motor which provides high starting torque and efficient running operation while doing away with the problem of contact welding upon motor stalling or momentary interruption of the line voltage during or immediately following starting. Other objects and features of this invention will be in part apparent and in part pointed out hereinafter.

Briefly, the single phase motor starting and running circuit of this invention with a main field winding and a start field winding connected in parallel coupled across a source of single phase, alternating current potential comprises a single pole double throw switch in series with the start field winding to switch between a start impedance element and a run capacitor and actuation means for sensing motor speed or another desired characteristic to cause the switching from the start mode to the run mode. Upon a single phase, alternating current potential being applied across the main winding and start winding, the single pole double throw switch is normally positioned or is caused to be positioned by the actuation means to energize the start impedance element for good starting torque. When the motor reaches a predetermined condition the actuation means switches the start impedance element out of the circuit and energizes the run capacitor. If motor stalling should occur or a line interruption should take place during or immediately following starting, the actuation means will cause the single pole double throw switch to change back to the starting mode but this cannot cause contact welding problems as in previous designs because there is no current path in the circuit in which the start winding impedance is not in series with the contacts. This starting and running circuit never has the run capacitor in a continuous current loop with the start impedance element so no current surge between them is possible to cause contact welding. The start winding impedance is always in series with the contacts. Also, the motor can be restarted without delay.

Other objects and features of the invention will become more readily understood from the following detailed description and appended claims, when read in conjunction with the accompanying drawings in which like reference numerals designate like parts throughout the figures thereof.

DESCRIPTION OF THE PREFERRED EMBODIMENT

Figure 1:
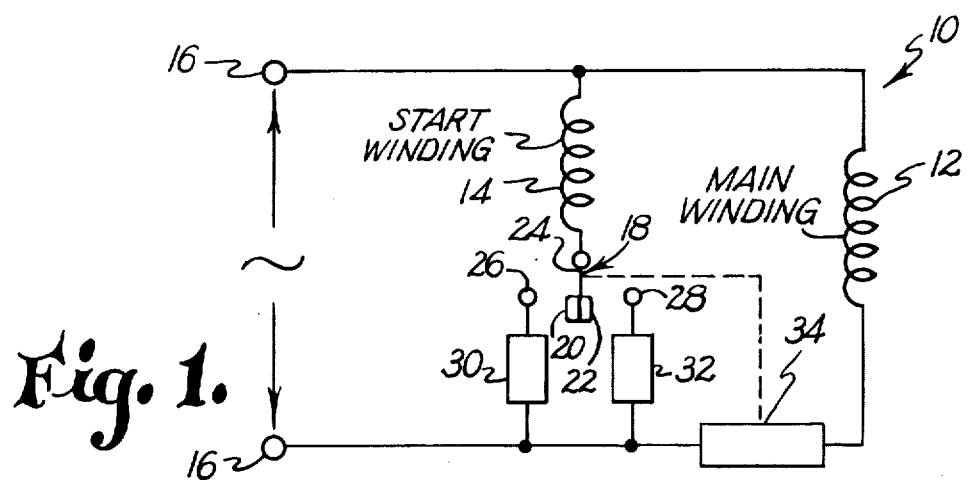
FIG. 1 is a schematic drawing showing the improved motor starting and running circuit of this invention.
Figure 4:
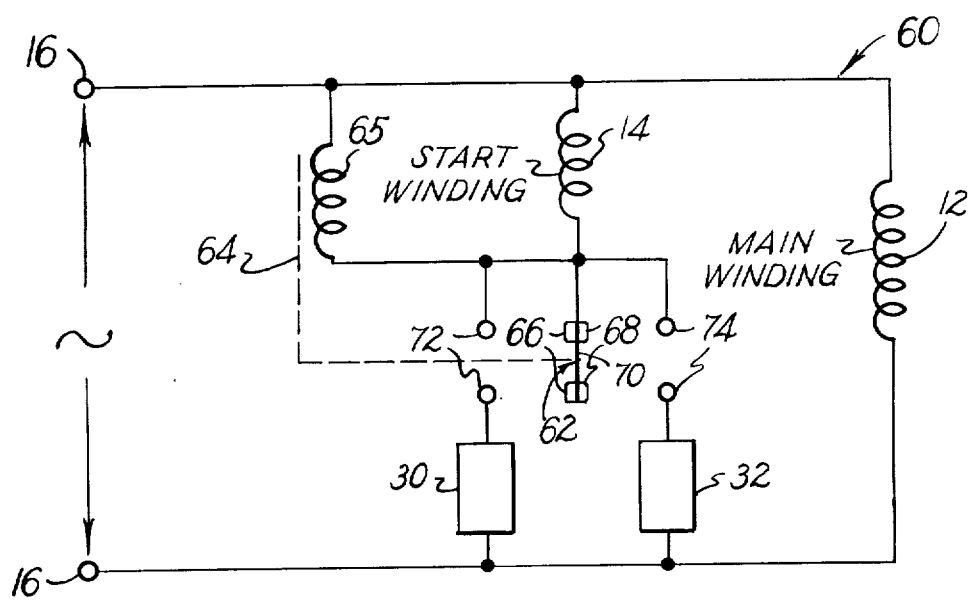
FIG. 4 is a schematic drawing similar to FIG. 1 using double pole double throw switch with a potential relay to actuate the switch.

Referring to the drawings, FIG. 1 shows a schematic diagram of a starting and running circuit 10 of this invention for a single phase, alternating current motor, having a main field winding 12 and a start field winding 14 connected in parallel directly across external terminals 16 which are adapted to be connected to a source of single phase alternating current potential. Both main winding 12 and start winding 14 are conventionally formed of a plurality of coils distributed in the slots of a stator core member, the slots communicating with a bore in which a squirrel cage rotor is rotatably positioned. Connected in series with start winding 14 is a single pole double throw switch 18 although a double pole double throw switch could be used with minor circuit modifications as shown in FIG. 4. Single pole double throw switch 18 has two contacts 20, 22 which are disposed at the end of switch arm 24. Contacts 20, 22 are positioned to be able to make contact with a start mode contact 26 and a run mode contact 28, respectively of the start mode means 30 and run mode means 32 to be discussed below. Switch 18 is actuated by actuation means 34 such as a current relay, thermal relay, time delay relay or even a centrifugal switch coupled in series with main winding 12. In response to actuation means 34 single pole double throw switch 18 energizes and de-energizes into or out of the circuit start mode means 30 and run mode means 32 to provide high starting torque operation or efficient running operation depending on motor speed or another desired characteristic. Start means 30 and run means 32 when energized are serially connected with start winding 14 coupled across main winding 12.

In accordance with this invention, both start mode means 30 and run mode means 32 comprise various impedance elements for optimum operation and cost effectiveness for a chosen application as shown by the two preferred embodiments described below.

Figure 2:
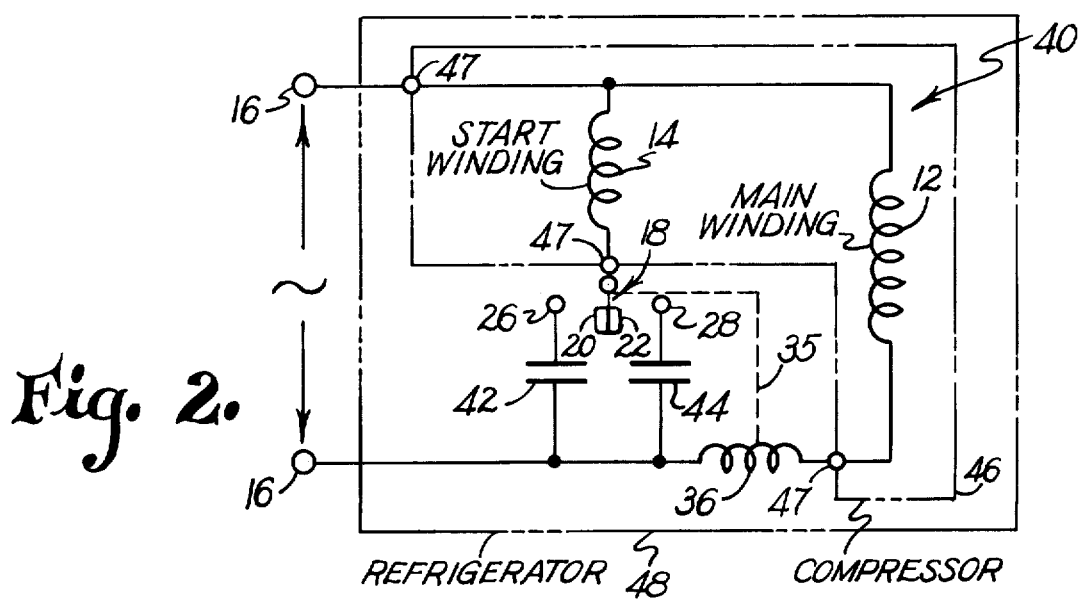
FIG. 2 is a schematic drawing of a preferred embodiment of the improved motor starting and running circuit of this invention connected to a hermetically sealed compressor housing of a refrigerator which contains a motor.

FIG. 2 shows a preferred starting and running circuit 40 of this invention especially useful for a hermetically sealed compressor 46 with connector points 47 of a refrigerator 48 shown in block form. Starting circuit 40 is similar to circuit 10 except start means 30 is replaced with a start capacitor 42, run means 32 is replaced with a run capacitor 44, and actuation means 34 is replaced with a current relay 35 with an operating coil 36. Start capacitor 42 is chosen to provide a high starting torque characteristic and run capacitor 44 is chosen to provide high efficiency motor operation. During the starting of the motor, start capacitor 42 is energized until a predetermined motor speed or another desired characteristic is achieved at which time start capacitor 42 is de-energized and run capacitor 44 is energized.

Figure 3:
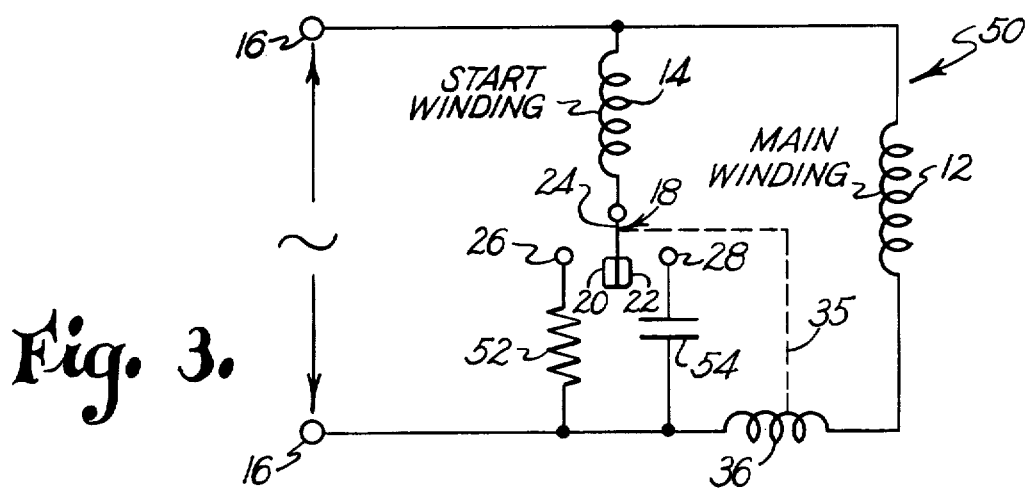
FIG. 3 is a schematic drawing of a second preferred embodiment of the improved motor starting and running circuit of this invention.

FIG. 3 shows a second preferred starting and running circuit 50 of this invention similar to circuit 40 of FIG. 2 but employing a resistance start mode. In this embodiment a start resistor 52 is positioned in the start mode to provide high torque resistance starting. Once predetermined motor speed or another desired characteristic is reached, start resistor 52 is de-energized and run capacitor 54 is energized for high efficiency running of the motor. It is to be understood that the start resistor may be just a piece of copper wire to complete the circuit.

In the circuits shown by FIGS. 1-3 an initial voltage applied to them will cause current relay 35 to actuate single pole double throw switch 18 to energize the start mode to provide high starting torque. At a predetermined motor speed or another desired characteristic, the current relay will actuate switch 18 to de-energize start mode 30 and to energize run mode 32. This improved system of energizing and de-energizing the start mode and the run mode overcomes the prior art problems of switch contact welding if stalling of the motor or momentary interruption of the line voltage occurs during or immediately following starting. There is no electrical path present through the contacts which does not have the start winding impedance in series with the contacts. The single pole double throw switch does not allow current surges between start means and run means because they are never in electrical connection with one another. This system also allows restarting immediately upon the line voltage being reapplied.

FIG. 4 shows a starting and running circuit 60 similar to circuit 10 of FIG. 1 using a double pole double throw switch 62 and a potential relay 64 with a coil 65 as the actuating means. Double pole double throw switch 62 is of conventional design having two pairs of contacts 66 and 68 which are disposed on opposite sides of a switch arm 70. Contacts 66 are positioned to be able to make contact with start mode contacts 72 and contacts 68 are positioned to be able to make contact with run mode contacts 74. Upon actuation by potential relay 62 either start mode means 30 or run mode means 32 is energized and the other is de-energized.

Thus, a unique single phase motor starting and running circuit has been disclosed which provides good starting torque and efficient motor operation while eliminating the problem of switch contact welding during stalling of the motor or a momentary line voltage interruption during or immediately following starting.

Various changes and modifications in the above-described device will be readily apparent to those skilled in the art. Any of such changes or modifications are deemed to be within the spirit and scope of the present invention as set forth in the appended claims.

I claim:

1. A starting and running circuit for a single phase alternating current induction motor having a main winding and a start winding comprising a start mode resistor adapted to be placed electrically in series with said start winding when energized, a run mode capacitor adapted to be placed electrically in series with said start winding when energized, switching means in series with said start winding to switch between and thereby energize and de-energize said start mode resistor and said run mode capacitor, and actuation means responsive to a motor condition to control said switching means.

* * * * *